United States Patent [19]
Yamana et al.

[11] Patent Number: 6,074,588
[45] Date of Patent: Jun. 13, 2000

[54] MOLD RELEASING AGENT, CURED FILM OBTAINED THEREFROM AND MOLDING METHOD USING SAID MOLD RELEASING AGENT

[75] Inventors: Masayuki Yamana; Tomohiro Hosomi; Hirotoshi Sakashita; Masato Kashiwagi, all of Settsu, Japan

[73] Assignee: Daikin Industries, Ltd., Osaka, Japan

[21] Appl. No.: 08/646,374

[22] PCT Filed: Nov. 18, 1994

[86] PCT No.: PCT/JP94/01961

§ 371 Date: May 15, 1996

§ 102(e) Date: May 15, 1996

[87] PCT Pub. No.: WO95/14750

PCT Pub. Date: Jun. 1, 1995

[30] Foreign Application Priority Data

Nov. 22, 1993 [JP] Japan ................................. 5-921920

[51] Int. Cl.[7] ........................................ B29C 41/02
[52] U.S. Cl. .................... 264/130; 264/213; 264/264; 264/300; 264/338; 525/104; 528/34; 528/29
[58] Field of Search ................ 528/34, 29; 264/213, 264/264, 300, 338, 130; 525/104

[56] References Cited

U.S. PATENT DOCUMENTS

| | | | |
|---|---|---|---|
| 3,189,576 | 6/1965 | Sweet | 260/46.5 |
| 3,419,516 | 12/1968 | Taruo . | |
| 3,624,190 | 11/1971 | Cekada et al. | 264/41 |
| 3,628,996 | 12/1971 | Weber | 117/138.8 A |
| 3,742,004 | 6/1973 | Nitzche et al. . | |
| 3,758,441 | 9/1973 | Nitzche et al. . | |
| 3,941,856 | 3/1976 | Creasey et al. | 260/825 |
| 4,018,734 | 4/1977 | Dumouiin | 260/29.1 |
| 4,308,212 | 12/1981 | Takamizawa et al. | 260/408 |
| 4,534,928 | 8/1985 | Martin | 264/334 |
| 4,720,530 | 1/1988 | Wurminghausen . | |
| 4,889,770 | 12/1989 | Ona et al. | 428/447 |
| 5,079,299 | 1/1992 | Hisamoto et al. | 525/100 |
| 5,152,950 | 10/1992 | Ona et al. | 264/315 |
| 5,804,674 | 9/1998 | Yamana et al. | 525/477 |

FOREIGN PATENT DOCUMENTS

| | | |
|---|---|---|
| 057874 | 8/1982 | European Pat. Off. . |
| 0311061 | 10/1988 | European Pat. Off. . |
| 385919 | 9/1990 | European Pat. Off. . |
| 399526 | 11/1990 | European Pat. Off. . |
| 467406 | 1/1992 | European Pat. Off. . |
| 2335569 | 1/1974 | Germany . |
| 58-045298 | 3/1983 | Germany . |
| 60-035373 | 8/1985 | Germany . |
| 45-32775 | 10/1970 | Japan . |
| 49-14531 | 2/1974 | Japan . |
| 49-45065 | 4/1974 | Japan . |
| 64-83086 | 3/1989 | Japan . |
| 1-95156 | 4/1989 | Japan . |
| 1169411 | 11/1969 | United Kingdom . |
| WO9113945 | 9/1991 | WIPO . |

*Primary Examiner*—Margaret G. Moore
*Attorney, Agent, or Firm*—Varndell & Varndell, PLLC

[57] ABSTRACT

A mold releasing agent comprising a silicon-containing compound represented by the formula:

$$R^1{}_n SiR^2{}_{4-n}$$

wherein $R^1$ is $$-O-\overset{O}{\underset{\|}{C}}-R^3, \quad -O-\overset{R^3}{\underset{\|}{C}}=CH_2,$$

$$-O-N=\overset{R^3}{\underset{R^4}{C}}, \quad -\overset{R^3}{\underset{|}{N}}-\overset{|}{\underset{\|}{C}}-R^4 \text{ or}$$

$$-NH-\bigcirc$$

($R^3$ and $R^4$ are a hydrocarbon group having 1 to 4 carbon atoms), $R^2$ is a hydrocarbon group having 1 to 4 carbon atoms or a halogenated hydrocarbon group having 1 to 4 carbon atoms, n is 3 or 4, and a silicon- and/or fluorine-containing compound having at least two hydroxyl groups or alkoxyl groups in one molecule. The mold releasing agent of the present invention is excellent in mold releasing property, has a long life, provides a good surface finishing of molded article, and has no influence on secondary processability.

11 Claims, No Drawings

MOLD RELEASING AGENT, CURED FILM OBTAINED THEREFROM AND MOLDING METHOD USING SAID MOLD RELEASING AGENT

TECHNICAL FIELD

The present invention relates to a mold releasing agent, a cured film obtained therefrom and a method of molding using such a mold releasing agent, and specifically relates to a mold releasing agent, a cured film and a molding method, which are used when producing molded articles of high molecular compounds such as synthetic resins and rubbers.

BACKGROUND ART

In order to obtain molded articles from resins or rubbers, molding is carried out after a die is filled with resin or rubber materials, and usually the inner surface of the die is previously coated with a mold releasing agent before filling.

As the mold releasing agent, there are waxes such as a paraffin wax and a polyethylene wax, silicones such as a polydimethylsiloxane oil and a silicone resin, organic compounds such as a glycol, a derivative of fatty acid and a perfluoroalkyl group-containing compound, and inorganic compounds such as mineral oil, talc and mica, which are used in the form of dispersion or solution in water or an organic solvent.

The above-mentioned mold releasing agents are usually applied every time of the filling. It is desired that a mold releasing agent having a lengthy life is developed to decrease the number of steps of production process from the viewpoint of workability. Also since the mold releasing agent is applied every time of the filling, there occurs a problem of contamination of a die due to deposition of the mold releasing agent, and a degree of contamination is large particularly in case of the wax type mold releasing agent. Further the reason why the coating is necessary every time of the filling is that basically there is transfer of the mold releasing agent to the molded article, which causes poor finishing such as stickiness of the molded article and coating failure and adhesion failure on the molded article in the succeeding steps. Therefore the molded articles are rinsed with an organic solvent such as trichloroethane after molding. Particularly the silicone type mold releasing agent is apt to cause the coating failure and adhesion failure.

Also in case of making molded articles of polyurethane foam, there is a drawback such that cells on surface become rough at the time of molding. This is observed remarkably particularly in case of using the silicone oil as the mold releasing agent.

Various mold releasing agents have been developed to eliminate the above-mentioned drawbacks. Examples are a mixture of phosphate having a perfluoroalkyl group of 4 to 20 carbon atoms or its salt with a silicone oil (JP-B-23270/1978 and JP-B-23271/1978), a mixture of phosphate having a perfluoroalkyl group of 4 to 20 carbon atoms or its salt with a silicone varnish (JP-B-48035/1982), a mixture of a perfluoroalkyl group-containing polyether compound with a silicone oil (JP-B-32513/1984) and the like. Those mold releasing agents are preferable and excellent in mold releasing property and have a life longer than that of conventional ones. Further the mold releasing agent prepared by using the mixture of the perfluoroalkyl group-containing polyether compound and the silicone oil has almost no effect on secondary processability with respect to most of high molecular compounds. However even those mold releasing agents cannot satisfy the mold releasing property and life which have been required in view of the high molecular compound molded articles having complicated shape and large size.

As a mold releasing agent of cured film forming type having a longer life, JP-B-39804/1991 discloses a mold releasing agent containing a ladder polymer of a perfluoroalkyl group-containing acrylic polymer and organosilsesquioxane. That mold releasing agent is excellent in initial mold releasing property and its life is made longer to a certain extent. However since strength of the cured film is not sufficient, a desired life cannot be obtained.

Also JP-B-11605/1991 discloses a mold releasing agent containing polydimethylsiloxane, an alkoxysilane represented by the formula:

$$(Z^1O)_u SiZ^2_{4-u}$$

(wherein $Z^1$ is methyl, ethyl, propyl or methoxyethyl, $Z^2$ is a monovalent hydrocarbon group having 1 to 4 carbon atoms or a halogenated hydrocarbon group having 1 to 4 carbon atoms, u is 3 or 4) or its oligomer product prepared through partial hydrolysis and condensation, and a metal alkoxide such as tetraalkyl titanate. However this mold releasing agent is also not sufficient in the mold releasing property and the secondary molding processability.

The present invention was made to solve the above-mentioned problems, and an object of the present invention is to provide a mold releasing agent having excellent mold releasing property and a longer life, giving excellent surface finishing of molded articles and having no effect on secondary processability such as coating and adhesion of the molded articles.

DISCLOSURE OF THE INVENTION

The present invention relates to the mold releasing agent comprising (A) a silicon-containing compound represented by the formula (I):

$$R^1_n SiR^2_{4-n} \tag{I}$$

wherein $R^1$ is

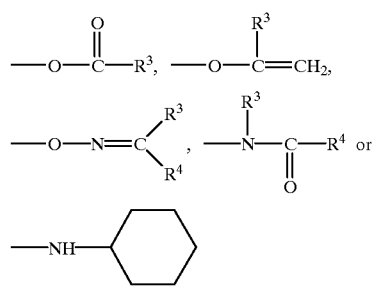

($R^3$ and $R^4$ are a hydrocarbon group having 1 to 4 carbon atoms, respectively), $R^2$ is a hydrocarbon group having 1 to 4 carbon atoms or a halogenated hydrocarbon group having 1 to 4 carbon atoms, n is 3 or 4, and (B) a silicon- and/or fluorine-containing compound having at least two hydroxyl groups or alkoxyl groups in one molecule, and relates to a cured film obtained from the above-mentioned mold releasing agent and to a molding method using such a mold releasing agent.

BEST MODE FOR CARRYING OUT THE INVENTION

In the silicon-containing compound (A) of the present invention, which is represented by the formula (I):

$R^1{}_n SiR^2{}_{4-n}$, $R^1$ is the group represented by

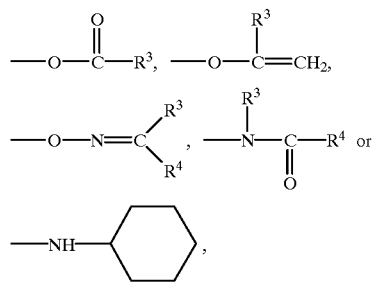

and

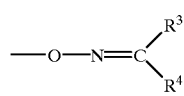

is most preferable from the viewpoint of its reactivity, non-corrosive property and commercial availability. In the above formula, $R^3$ and $R^4$ are a hydrocarbon group having 1 to 4 carbon atoms, respectively. Examples of that hydrocarbon group are methyl, ethyl, propyl, butyl, isopropyl, isobutyl, t-butyl and the like. From the reactivity point of view, methyl and ethyl are preferable as $R^3$ and $R^4$. With respect to combination of $R^3$ and $R^4$, it is preferable that any one of them is methyl or ethyl from the viewpoint of reactivity. $R^2$ is a hydrocarbon group having 1 to 4 carbon atoms or a halogenated hydrocarbon group having 1 to 4 carbon atoms. Examples of the hydrocarbon group are methyl, ethyl, propyl, butyl, isopropyl, isobutyl, t-butyl and the like, and examples of the halogenated hydrocarbon group are trifluoropropyl, trichloroethyl and the like. Among them, a hydrocarbon group having 1 to 2 carbon atoms is preferable from the viewpoint of mold releasing property and reactivity. Since n is 3 or 4, $R^2$ exists one or is absent.

Example of the compound (A) represented by the above-mentioned formula (I) is, for instance, a compound represented by the formula (II):

$$R^1{}_n SiR^2{}_{4-n} \qquad (II)$$

wherein $R^1$ is

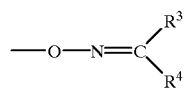

($R^3$ and $R^4$ are a hydrocarbon group having 1 to 4 carbon atoms, respectively), $R^2$ is a hydrocarbon group having 1 to 4 carbon atoms or a halogenated hydrocarbon group having 1 to 4 carbon atoms, n is 3 or 4.

Therefore, as the silicon-containing compound (A), there are used, for example, carboxylic acid-releasing type compounds such as

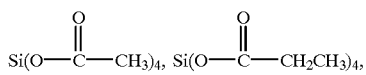

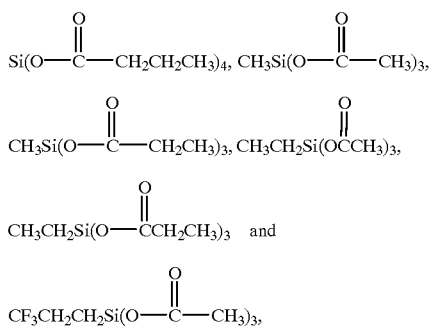

ketone-releasing-type compounds such as

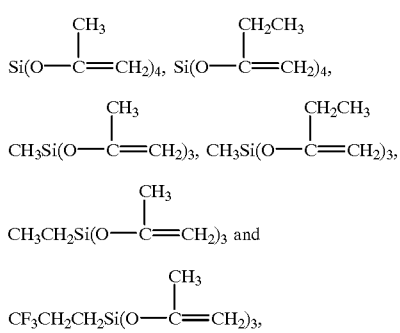

amide-releasing type compounds such as

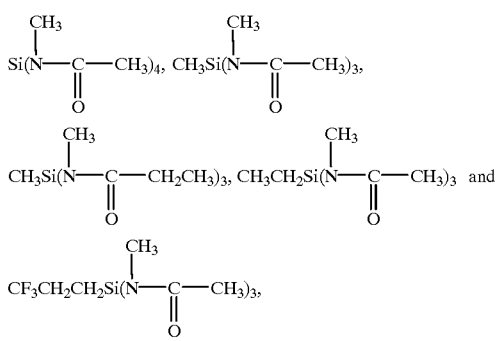

amine-releasing-type compounds such as

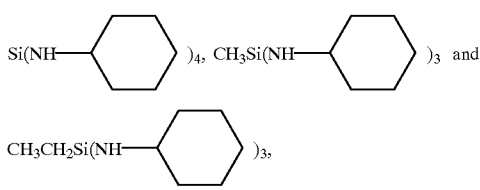

oxime-releasing-type compounds such as

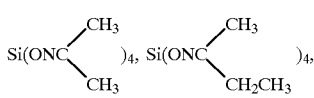

-continued

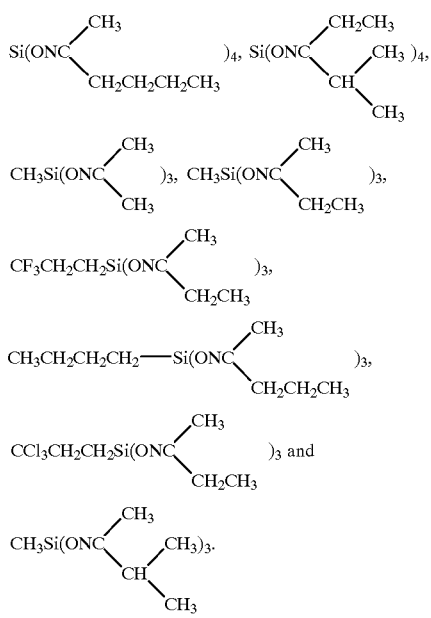

The above-mentioned silicon-containing compound (A) has function of crosslinking the silicon- and/or fluorine-containing compound (B) explained hereinbelow.

Examples of the silicon- and/or fluorine-containing compound (B) having at least two hydroxyl groups or alkoxyl groups in one molecule are cited below.

For example, preferable is a compound represented by the formula (V):

$$X^1-\underset{\underset{R^6}{|}}{\overset{\overset{R^5}{|}}{Si}}-O-(\underset{\underset{R^8}{|}}{\overset{\overset{R^7}{|}}{Si}}-O)_j-(\underset{\underset{X^3}{|}}{\overset{\overset{R^9}{|}}{Si}}-O)_k-\underset{\underset{R^{11}}{|}}{\overset{\overset{R^{10}}{|}}{Si}}-X^2 \quad (V)$$

wherein j is a positive integer, k is 0 or a positive integer, j+k is not less than 10 in average, preferably an integer of 20 to 5,000, $X^1$ and $X^2$ are —OH, —$OR^{12}$, —$R^{13}NH_2$, —$R^{14}OH$, —$R^{15}COOH$, —$R^{15}SH$ or —$R^{12}$, $X^3$ is —OH, —$OR^{12}$, —$R^{13}NH_2$, —$R^{14}OH$, —$R^{15}COOH$ or —$R^{15}SH$ [provided that, when k is 0, both $X^1$ and $X^2$ are —OH or —$OR^{12}$, and when k is not 0, at least two of $X^1$, $X^2$ and $X^3$ are —OH or —$OR^{12}$, $R^{12}$ is an alkyl group having 1 to 4 carbon atoms, a halogenated alkyl group having 1 to 4 carbon atoms or phenyl, $R^{13}$ is an alkylene group having 1 to 10 carbon atoms or $R^{16}NHCH_2CH_2$— ($R^{16}$ is an alkylene group having 1 to 4 carbon atoms), $R^{14}$ is

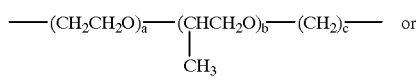

or

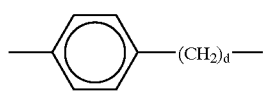

(a is 0 or an integer of 1 to 15, b is 0 or an integer of 1 to 15, c is an integer of 1 to 10, d is an integer of 1 to 5), $R^{15}$ is an alkylene group having 1 to 10 carbon atoms], $R^5$, $R^6$, $R^7$, $R^8$, $R^9$, $R^{10}$ and $R^{11}$ are an alkyl group having 1 to 4 carbon atoms, a halogenated alkyl group having 1 to 4 carbon atoms or phenyl. The recurring units of

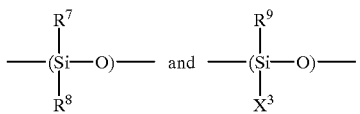

are bonded in the form of random and/or block.

Examples of $R^5$, $R^6$, $R^7$, $R^8$, $R^9$, $R^{10}$, $R^{11}$ and $R^{12}$ are an alkyl group such as methyl, ethyl, propyl, isopropyl, butyl, isobutyl or t-butyl, a halogenated alkyl group such as trifluoroethyl, trifluoropropyl or trichloropropyl, phenyl and the like. Among them, methyl, ethyl and trifluoropropyl are preferable from the viewpoint of reactivity and mold releasing property.

Examples of $R^{13}$ are an alkylene group such as —$CH_2$—, —$(CH_2)_2$—, —$(CH_2)_3$—, —$(CH_2)_4$—,

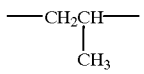

or

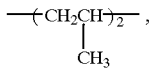

—$CH_2CH_2NHCH_2CH_2$—, —$CH_2CH_2CH_2NHCH_2CH_2$— and the like. Among them, —$(CH_2)_2$—, —$(CH_2)_3$— and —$(CH_2)_4$— are preferable from the viewpoint of reactivity and mold releasing property.

Examples of $R^{14}$ are —$(CH_2)_2$—, —$(CH_2)_3$—, —$(CH_2)_4$—, —$(CH_2)_{10}$—,

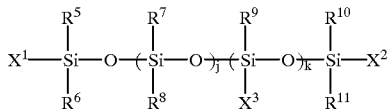

—$CH_2CH_2OCH_2CH_2CH_2$—, —$(CH_2CH_2O)_{15}$—$CH_2CH_2CH_2$—,

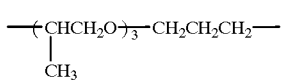

and the like. Among them, —$(CH_2)_2$—, —$(CH_2)_3$—, —$(CH_2)_4$— and —$CH_2CH_2OCH_2CH_2CH_2$— are preferable from the viewpoint of reactivity and mold releasing property.

Examples of $R^{15}$ are —$(CH_2)_2$—, —$(CH_2)_3$—, —$(CH_2)_4$—, —$(CH_2)_5$—, —$(CH_2)_{10}$— and the like. Among them, —$(CH_2)_2$—, —$(CH_2)_3$— and —$(CH_2)_4$— are preferable from the viewpoint of reactivity and mold releasing property.

Examples of $X^1$ and $X^2$ are —OH, —$OCH_3$, —$OCH_2CH_3$, —$OCH_2CH_2CH_3$, —$CH_2CH_2CH_2NH_2$, —$CH_2CH_2CH_2OH$, —$CH_2CH_2CH_2OCH_2CH_2OH$, —$(CH_2)_{10}$—COOH, —$CH_2CH_2CH_2SH$, —$CH_3$, —$CH_2CH_3$ and the like. Among them, —OH, —$OCH_3$, —$OCH_2CH_3$ and —$OCH_2CH_2CH_3$ are preferable from the viewpoint of reactivity and mold releasing property.

Examples of $X^3$ are —OH, —$OCH_3$, —$OCH_2CH_3$, —$OCH_2CH_2CH_3$, —$CH_2CH_2CH_2NH_2$, —CH$_2$CH$_2$CH$_2$OH, —CH$_2$CH$_2$CH$_2$OCH$_2$CH$_2$OH, —(CH$_2$)$_{10}$—COOH, —CH$_2$CH$_2$CH$_2$SH and the like. Among them, —OH, —OCH$_3$, —OCH$_2$CH$_3$ and —OCH$_2$CH$_2$CH$_3$ are preferable from the viewpoint of reactivity and mold releasing property.

From the viewpoint of reactivity and mold releasing property, it is preferable that j is an integer of 10 to 5,000.

From the viewpoint of reactivity and mold releasing property, it is preferable that k is 0 or an integer of 1 to 500.

The compounds represented by the formula (V) may be a mixture of the compounds in which the sum of j and k differs from each other. The sum of j and k is not less than 10 in average, and preferably is an integer of 20 to 5,000 from the viewpoint of reactivity and mold releasing property.

It is preferable that a is 0 or an integer of 1 to 15 from the viewpoint of reactivity and mold releasing property.

It is preferable that b is 0 or an integer of 1 to 15 from the viewpoint of reactivity and mold releasing property.

It is preferable that c is an integer of 1 to 10 from the viewpoint of reactivity and mold releasing property.

Examples of the compounds represented by the formula (V) are:

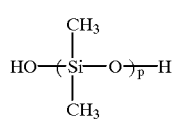

(p is 20 to 5,000 in average),

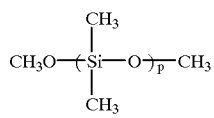

(p is 20 to 5,000 in average),

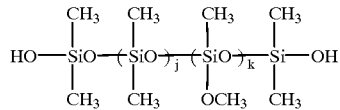

(j + k is 20 to 5,000 in average),

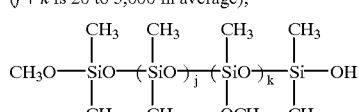

(j + k is 20 to 5,000 in average),

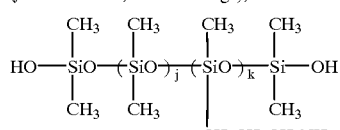

(j + k is 20 to 5,000 in average),

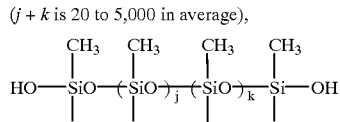

(j + k is 20 to 5,000 in average),

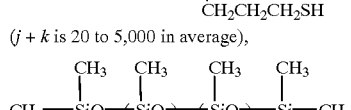

(j + k is 20 to 5,000 in average, k is not less than 2),

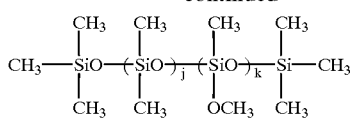

(j + k is 20 to 5,000 in average, k is not less than 2),

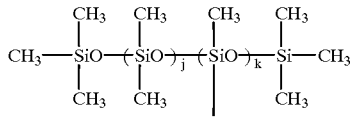

(j + k is 20 to 5,000 in average, k is not less than 2),

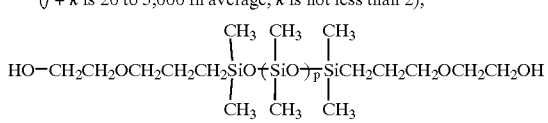

(p is 20 to 5,000 in average)

and the like.

Among the compounds represented by the formula (V), preferable is a compound represented by the formula (VIII):

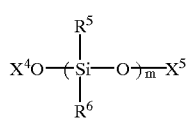

(VIII)

wherein $R^5$ and $R^6$ are an alkyl group having 1 to 4 carbon atoms, a halogenated hydrocarbon group having 1 to 4 carbon atoms or phenyl, respectively, $X^4$ and $X^5$ are hydrogen atom or a hydrocarbon group having 1 to 4 carbon atoms, respectively, m is not less than 10 in average, preferably 20 to 5,000.

Examples of $R^5$ and $R^6$ are a hydrocarbon group such as methyl, ethyl, propyl, butyl, isopropyl, isobutyl or t-butyl, and a halogenated hydrocarbon group such as trifluoroethyl, trifluoropropyl, difluoroethyl or trichloropropyl. Among them, preferable are methyl, ethyl, trifluoroethyl and trifluoropropyl from the viewpoint of reactivity and mold releasing property.

Examples of $X^4$ and $X^5$ are, H, CH$_3$, CH$_2$CH$_3$, CH$_2$CH$_2$CH$_3$,

CH$_2$CH$_2$CH$_2$CH$_3$ and the like, and among them, H and CH$_3$ are preferable from reactivity point of view.

The compounds represented by the formula (VIII) may be a mixture of the compounds having different numbers of m from each other, and m is not less than 10 in average, preferably 20 to 5,000, more preferably 20 to 3,000, further preferably 20 to 2,000 from the viewpoint of reactivity and mold releasing property.

Examples of the compounds represented by the formula (VIII) are:

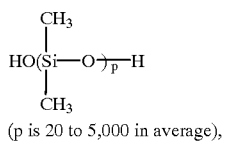

(p is 20 to 5,000 in average),

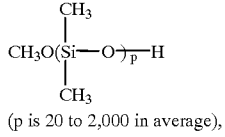

(p is 20 to 2,000 in average),

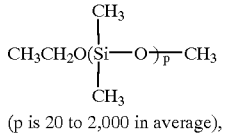

(p is 20 to 2,000 in average),

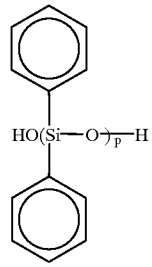

(p is 20 to 2,000 in average) and

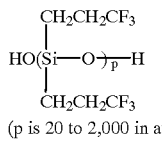

(p is 20 to 2,000 in average).

Further example of the silicon- and/or fluorine-containing compound (B) is a compound represented by the formula (VI):

$$Y^1OCH_2R^{16}O—R^{18}—R^{17}CH_2OY^2 \qquad (VI)$$

wherein $Y^1$ and $Y^2$ are hydrogen atom or a hydrocarbon group having 1 to 4 carbon atoms, respectively, $R^{16}$ is —$CF_2$—, —$CF_2CF_2$— or

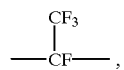

$R^{17}$ is —$CF_2$—, —$CF_2CF_2$— or

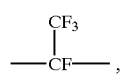

$R^{18}$ is at least one structural unit selected from the group consisting of —$(CF_2O)_{s^1}$—, —$(CF_2CF_2O)_{s^2}$— and —$(R^{19}O)_{s^3}$— ($R^{19}$ is

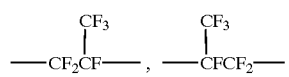

or —$CF_2CF_2CF_2$—, $s^1+s^2+s^3$ is not less than 5 in average, preferably 10 to 200).

The above-mentioned $R^{18}$ may be any of a homopolymer, a random copolymer, a block copolymer or an alternating copolymer.

Examples of $Y^1$ and $Y^2$ are hydrogen atom, methyl, ethyl, propyl, isopropyl, butyl and the like, and among them, hydrogen atom and methyl are preferable from reactivity point of view.

The compound represented by the formula (VI) may be a mixture of the compounds in which $s^1+s^2+S^3$ is different from each other, and $s^1+s^2+s^3$ is not less than 5 in average, preferably 10 to 200, more preferably 10 to 100, further preferably 10 to 50 from reactivity point of view.

Then preferable examples of the compound represented by the formula (VI) are as follows.

$HOCH_2(CF_2O)_{10}(CF_2CF_2O)_{12}CF_2CH_2OH$,
$HOCH_2CF_2CF_2O(CF_2CF_2CF_2O)_{10}CF_2CF_2O(CF_2CF_2CF_2O)_{10}CF_2CF_2CH_2OH$,
$CH_3OCH_2CF_2CF_2O(CF_2CF_2CF_2O)_{20}CF_2CF_2O(CF_2CF_2CF_2O)_{20}CF_2CF_2CH_2OH$ ps and

Further example of the silicon- and/or fluorine-containing compound (B) is a compound represented by the formula (VII):

$$RfA^1Si(OA^2)_{s^6}A^3_{3-s^6} \qquad (VII)$$

wherein Rf is a perfluoroalkyl group having 6 to 21 carbon atoms, $A^1$ is an alkylene group having 2 to 6 carbon atoms, $A^2$ is hydrogen atom or an alkyl group having 1 to 4 carbon atoms, $A^3$ is an alkyl group having 1 to 4 carbon atoms, $s^6$ is 2 or 3.

Examples of Rf are $CF_3(CF_2)_5$, $CF_3(CF_2)_7$, $CF_3(CF_2)_9$, $CF_3(CF_2)_{11}$, $CF_3(CF_2)_{13}$, $CF_3(CF_2)_{15}$, $CF_3(CF_2)_{17}$, $CF_3(CF_2)_{19}$,

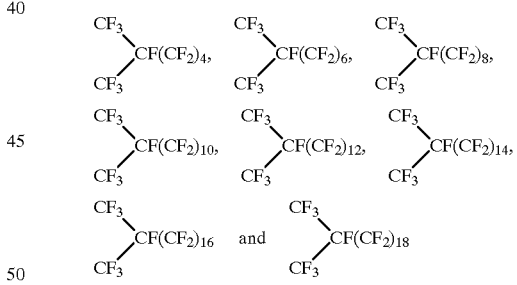

Among them, $CF_3(CF_2)_7$, $CF_3(CF_2)_9$, $CF_3(CF_2)_{11}$ and $CF_3(CF_2)_{13}$ are preferable from the viewpoint of mold releasing property.

Examples of $A^1$ are —$CH_2CH_2$—, —$CH_2CH_2CH_2CH_2$—,

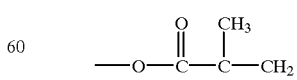

and —$(CH_2)_6$—, and from the viewpoint of mold releasing property, —$CH_2CH_2$— is preferable.

Examples of $A^2$ are hydrogen atom, —$CH_3$, —$CH_2CH_3$, —$CH_2CH_2CH_3$,

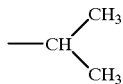

and —$CH_2CH_2CH_2CH_3$, and from the viewpoint of reactivity, hydrogen atom, —$CH_3$ and —$CH_2CH_3$ are preferable.

Examples of $A^3$ are methyl, ethyl, propyl, butyl, isopropyl, isobutyl and the like, and methyl and ethyl are preferable from the viewpoint of reactivity.

From the viewpoint of reactivity, $s^6$ is preferably 3.

Also an example of the silicon- and/or fluorine-containing compound (B) is a copolymer which has a number average molecular weight of not less than 1,000 and contains, as copolymerizing components, a compound represented by the formula (III):

(wherein Rf is the same as above, $A^4$ is an alkylene group having 1 to 6 carbon atoms, $A^5$ is

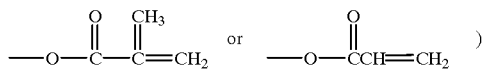

in an amount of not less than 20% (% by weight, hereinafter the same) and a compound represented by the formula (IV):

(wherein $A^6$ is hydrogen atom or a hydrocarbon group having 1 to 4 carbon atoms, $A^7$ is an alkylene group having 1 to 6 carbon atoms, $A^8$ is

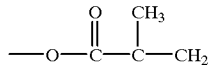

or

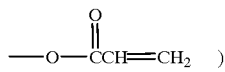

in an amount of not less than 2%. From the viewpoint of mold releasing property, the number average molecular weight is preferably not less than 3,000.

Rf is the same as above.

Examples of $A^4$ are —$CH_2$—, —$CH_2CH_2$—, —$CH_2CH_2CH_2CH_2$—,

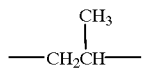

and —$(CH_2)_6$—, and from the viewpoint of mold releasing property, —$CH_2$— and —$CH_2CH_2$— are preferable.

Examples of the compound represented by the formula (III) are $CH_2$=$CHCO_2CH_2CH_2(CF_2)_7CF_3$, -continued $CH_2$=$CCO_2CH_2(CF_2)_9CF_3$,
  |
  $CH_3$ $CH_2$=$CHCO_2(CH_2)_6(CF_2)_{15}CF_3$,

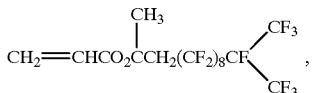

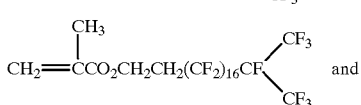

$CH_2$=$CHCO_2CH_2CH_2(CF_2)_4CF_3$.

Examples of $A^6$ are hydrogen atom, methyl, ethyl, propyl, butyl, isopropyl, isobutyl and the like, and from the viewpoint of reactivity, hydrogen atom and methyl are preferable.

Examples of $A^7$ are —$CH_2$—, —$CH_2CH_2$—,

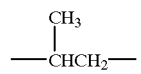

and —$(CH_2)_6$—.

Examples of the compound represented by the formula (IV) are $CH_2$=$CHCO_2CH_2CH_2OH$, $CH_2$=$CHCO_2CH_2CH_2CH_2OH$,

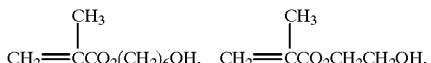

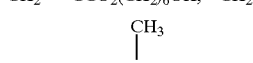

$CH_2$=$CHCO_2CH_2CH_2OCH_2CH_3$ and $CH_2$=$CHCO_2CH_2OCH_2CH_2CH_2CH_3$.

The compound represented by the formula (III) is contained in the copolymer in an amount of not less than 20%, preferably not less than 40%, more preferably not less than 80% from the viewpoint of mold releasing property, and preferable upper limit is 98%. When less than 20%, the mold releasing property tends to be lowered.

The compound represented by the formula (IV) is contained in the copolymer in an amount of not less than 2%, preferably not less than 3%, more preferably not less than 5% from the viewpoint of reactivity, and preferable upper limit is 20%. When less than 2%, the reactivity tends to be lowered.

As the copolymerizing components of the above-mentioned copolymer, in addition to the compounds represented by the formulae (III) and (IV), there may be used ethylene, propylene, vinyl chloride, vinylidene chloride, vinyl acetate, butyl vinyl ether, and an acrylate such as methyl methacrylate, butyl methacrylate, lauryl acrylate, stearyl acrylate, 2-ethylhexyl acrylate or glycidyl methacrylate. From a point of mold releasing property, there are preferably used an acrylate of higher alcohol such as lauryl acrylate, stearyl acrylate or 2-ethylhexyl acrylate.

The silicon- and/or fluorine-containing compound (the copolymer containing the compounds represented by the formulae (III) and (IV) as the copolymerizing components, and the compound represented by the formula (V), (VI), (VII) or (VIII)) contains at least two hydroxyl groups or alkoxyl groups in one molecule, and therefore after crosslinking reaction, a cured film having an excellent mold releasing property can be obtained.

The above-mentioned six kinds of compounds cited as the silicon- and/or fluorine-containing compounds may be used solely, in a mixture within one kind, or in a mixture of different kinds thereof.

In the mold releasing agents of the present invention, the above-mentioned silicon- and/or fluorine-containing compounds (a copolymer containing the compounds represented by the formulae (III) and (IV) as the copolymerizing compounds, and the compound represented by the formula (V), (VI), (VII) or (VIII)) mainly exhibit mold releasing property.

To the mold releasing agent of the present invention may be added a curing accelerator, a solvent and the like if necessary, in addition to the above-mentioned silicon-containing compound (A) and silicon- and/or fluorine-containing compound (B).

The curing accelerator is added optionally in case where the reaction of the silicon-containing compound with the silicon- and/or fluorine-containing compound does not proceed or proceeds slowly. Examples of the curing accelerator are metal alkoxides such as tetraalkyl titanate, tetraalkyl germanate, tetraalkyl zirconate and trialkoxy vanadium, and organic acid salts such as zinc octylate and tin octylate.

As the solvent, there can be used ones which contain no hydroxyl group and the like having reactivity with the above-mentioned silicon-containing compound (A) or silicon- and/or fluorine-containing compound (B). There are preferably used aliphatic hydrocarbons, alicyclic hydrocarbons, aromatic hydrocarbons, halogenated hydrocarbons and siloxane compounds. Examples of the aliphatic hydrocarbon are hexane, heptane, octane, decane, isooctane and the like. Examples of the alicyclic hydrocarbon are cyclohexane and the like. Examples of the aromatic hydrocarbon are toluene, xylene, benzene, ethylbenzene and the like. Examples of the halogenated hydrocarbon are trichloroethane, trichlorotrifluoroethane, dichloromethane, dichloromonofluoroethane, perchloroethylene, perfluorohexane, HCFC141b and the like. Examples of the siloxane compound are polysiloxane, cyclopolydimethylsiloxane and the like. Also there can be used ketone compounds such as acetone, methyl ethyl ketone and methyl isobutyl ketone and esters such as ethyl acetate and butyl acetate.

A weight ratio of the above-mentioned silicon-containing compound (A) to the silicon- and/or fluorine-containing compound (B) is 1/99 to 80/20, preferably 2/98 to 40/60, more preferably 2/98 to 30/70. When lower than 1/99 or higher than 80/20, there is a tendency that a good crosslinked film is not obtained and mold releasing property becomes worse.

The curing accelerator is used, for instance, in an amount of 0 to 10%, preferably 1 to 7% on the basis of the total amount of the silicon-containing compound (A) and the silicon- and/or fluorine-containing compound (B) though it depends on the reactivity of the compound (A) with the compound (B). When more than 10%, the mold releasing property tends to become worse.

In case where the solvent is used, its amount is such that the concentration of the components other than the solvent becomes 0.1 to 20%, preferably 0.5 to 10%, more preferably 1 to 10%. When the concentration is lower than 0.1%, there is a tendency that it becomes difficult to form a good film of the mold releasing agent and when higher than 20%, there is a tendency that a viscosity becomes too high and coating procedure becomes difficult.

The mold releasing agent of the present invention can be prepared in the form of one-liquid type, for example, by mixing the silicon containing compound (A) and the silicon- and/or fluorine-containing compound (B) and, if necessary, the solvent, curing accelerator or other components at normal temperature. In case where reactivity of the silicon-containing oxime compound with the silicon- and/or fluorine-containing compound is high, the mold releasing agent may be prepared in the form of two-liquid type in which the curing accelerator is stored separately from a mixture of the other components.

For example, the mold releasing agent of one-liquid type of the present invention is applied through brush-coating or spray-coating to the inner surface of a die at normal temperature to form the cured film of the present invention at normal temperature or elevated temperature. The heating temperature varies depending on materials, and is not more than 250° C., preferably 20° to 200° C. When lower than 0° C., the curing reaction tends to be difficult to proceed, and when higher than 250° C., the components of the mold releasing agent tend to be easily decomposed. In case of the two-liquid type, the curing accelerator is mixed with the other components just before use, and the mixture is applied through brush-coating or spray-coating to the inner surface of a die and if necessary, is heated to form the cured film of the present invention. The heating temperature varies depending on materials, and is not more than 250° C., preferably 20° to 200° C. When lower than 0° C., the curing reaction tends to be difficult to proceed, and when higher than 250° C., the components of the mold releasing agent tend to be easily decomposed. A thickness of the cured film of the present invention is not particularly limited, and is preferably from 0.1 to 100 μm, particularly from 0.2 to 20 μm, further preferably from 0.5 to 10 μm from the viewpoint of good mold releasing property irrespective of one-liquid type or two-liquid type.

It can be considered that, represented by the case of oxime-releasing-type silicon-containing compound, the curing reaction of mold releasing agent of the present invention proceeds in such a manner that (1) first, de-oxime reaction occurs and then (2) dehydration reaction or de-alcoholation reaction occurs to advance crosslinking reaction, as shown below.

(1) De-oxime reaction

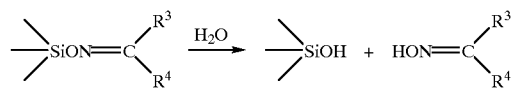

(2) Dehydration (crosslinking reaction)

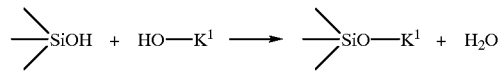

or de-alcoholation reaction (crosslinking reaction)

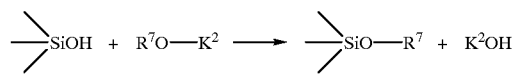

wherein HO—$K^1$ and $R^7O$—$K^2$ ($R^7$ is a hydrocarbon group having 1 to 4 carbon atoms) stand for the above-mentioned silicon- and/or fluorine-containing compound having at least two hydroxyl groups or alkoxyl groups in one molecule.

The following molding method can be achieved by using the mold releasing agent of the present invention. Namely, after the above-mentioned silicon-containing compound (A) and the silicon- and/or fluorine-containing compound (B) are coated on the inner surface of a die through the above-mentioned way and cured through the above-mentioned mechanism, a molding composition is introduced into the die to form a molded article and then the molded article is released from the die.

The die to which the mold releasing agent of the present invention is applied is a die made of aluminum, SUS, iron, epoxy resin, wood or the like, or electrocast with nickel or chrome-plated.

The molded articles released from the die by utilizing the mold releasing agent of the present invention are those obtained from molding compositions mainly comprising thermosetting resins such as polyurethane foam, epoxy resin, phenol resin and FRP, rubbers such as polyurethane rubber, H-NBR, NBR, silicone rubber, EPDM, CR, NR, fluorine-containing rubber, SBR, BR, IIR and IR, and the like.

The mold releasing agent of the present invention can be used in the form of aerosol filled in a can together with a propellant. Examples of the propellant are an aliphatic hydrocarbon, a halogenated hydrocarbon, carbon dioxide, nitrogen and the like. Examples of the aliphatic hydrocarbon are propane, butane, LPG, dimethyl ether and the like. Examples of the halogenated hydrocarbon are R-11, R-12, HFC-134a, HCFC-142b, HCFC-22, HCFC-141b and the like. The above-mentioned propellant is contained in the mold releasing agent in an amount of 10 to 95%, preferably 20 to 90%, more preferably 30 to 90%. When less than 10%, there is a tendency that good atomization cannot be executed and a uniform film is not formed. When more than 95%, there is a tendency that the film becomes thinner and mold releasing property is lowered.

Then the present invention is explained by means of Examples and Comparative Examples, but is not limited to the Examples.

EXAMPLE 1

A mold releasing agent of the present invention was prepared by mixing 2 parts (part by weight, hereinafter the same) of the silicon-containing compound, i.e. $CH_3Si(ON=C(CH_3)_2)_3$, 93 parts of the silicon- and/or fluorine-containing compound having at least two hydroxyl groups or alkoxyl groups in one molecule, i.e.

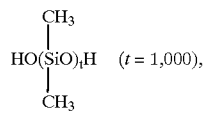

$HO(\underset{CH_3}{\underset{|}{\overset{CH_3}{\overset{|}{Si}}O}})_t H$  ($t = 1,000$), 5 parts of the curing accelerator, i.e. tetra(2-ethylhexyl) titanate and the solvent, i.e. toluene. The amount of toluene in the mold releasing agent was adjusted to be 95%, that is, the total concentration of the other three components was 5%.

By using the obtained mold releasing agent, the following tests, i.e. test for continuous mold releasing property, test for application and test for finishing were carried out.

[Test for continuous mold releasing property]

(Mold releasing property and life of mold releasing agent)

The mold releasing agent was applied through brush-coating to an inner surface of aluminum die having an inner dimensions of 6 cm$\phi$×1 cm. The die was heated at 150° C. for ten minutes to cure the mold releasing agent to form a cured film on the inner surface of the die. The thickness of the cured film was 2.5 μm.

To this die was poured a urethane composition having the following components after sufficiently mixing by a mixer.

| | |
|---|---|
| Sanilex FA 912[1] | 100 parts |
| Ethylene glycol | 19 parts |
| R-11 (trichloromonofluoromethane) | 5 parts |
| DABCO (1,4-diazabicyclo[2,2,2]octane) | 0.9 part |
| Dibutyltindilaurate | 0.025 part |
| Milionate MTL[2] | 104 parts |

The component 1) is polyol available from Sanyo Kasei Kogyo Kabushiki Kaisha and 2) is isocyanate available from Nippon Polyurethane Kogyo Kabushiki Kaisha.

After the urethane composition was allowed to be cured at room temperature for ten minutes to form a molded article of urethane, a tensile force (g/cm$^2$) thereof was measured with a tensile tester (tension rate: 20 mm/min) in the manner of pulling a pin which had been stood in urethane previously during molding, to evaluate the mold releasing property according to the following criterion. The results are shown in TABLE 7.

A: not more than 100 g/cm$^2$
B: more than 100 g/cm$^2$ and not more than 200 g/cm$^2$
C: more than 200 g/cm$^2$ and not more than 300 g/cm$^2$
D: more than 300 g/cm$^2$ Then the steps of molding and releasing of the urethane were repeated up to 50 times without re-coating of the mold releasing agent. The mold releasing properties at the steps of tenth, thirtieth and fiftieth molding were evaluated. The results are shown in TABLE 7.

[Test for application] (Secondary processability)

A sufficiently mixed primer having the following composition was applied through brush-coating to the molded article of urethane which was the first molded article obtained in the above test for continuous mold releasing property.

| | |
|---|---|
| Planit L#75[3] | 100 parts |
| Planit L#75 thinner[4] | 100 parts |

The component 3) is an acrylic primer paint available from Dai Nippon Toryo Co., Ltd., and 4) is a thinner available from the same company.

After drying at 80° C. for ten minutes, a top coat having the following composition was applied through brush-coating on the primer layer.

| | |
|---|---|
| Planit S[5] | 100 parts |
| Planit thinner #10[6] | 100 parts |

The component 5) is an acrylic paint available from Dai Nippon Toryo Co., Ltd., and 6) is a thinner available from the same company.

After drying at 100° C. for 40 minutes, a cross cut test was carried out according to JIS K5400, and the evaluation was made based on the number of remaining cross-cut pieces of the coating after the test. The indication 100/100 means good adhesion, and 0/100 means that the cross-cut pieces were completely peeled off. The results are shown in TABLE 7.

[Test for finishing] (Finishing of molding surface)

The finished surface of the molded article of urethane which was first molded article obtained in the above test for continuous mold releasing property, was observed with naked eyes, and evaluated according to the following criterion. The results are shown in TABLE 7.

A: Good finished surface.
B: Pin holes are found partly on the surface.
C: Pin holes are found all over the surface.

EXAMPLES 2 TO 21

The mold releasing agents of the present invention were prepared in the same manner as in EXAMPLE 1 except that the compositions of the silicon-containing compound, silicon- and/or fluorine-containing compound, curing accelerator and solvent were changed as shown in TABLES 1 to 5. The cured films were formed in the same manner as in EXAMPLE 1 with the curing conditions being changed as shown in TABLES 1 to 5. Thickness of each film is shown in TABLES 1 to 5.

TABLE 1

| | Silicon-containing compound | | Silicon- and/or fluorine-containing compound | | Curing accelerator | | Concentration of 3 components % | Solvent | Amount of solvent % | Curing conditions ° C. | Curing conditions Min. | Film thickness μm |
|---|---|---|---|---|---|---|---|---|---|---|---|---|
| | Compound | Part | Compound | Part | Compound | Part | | | | | | |
| Ex. 1 | $CH_3$<br>\|<br>$Si(ON{=}C(CH_3)_2)_3$ | 2 | $CH_3$<br>\|<br>$HO(SiO)_tH$<br>\|<br>$CH_3$ (t = 1000) | 93 | Tetra(2-ethylhexyl) titanate | 5 | 5 | Toluene | 95 | 150 | 10 | 2.5 |
| Ex. 2 | $CH_3$<br>\|<br>$Si(ON{=}C(CH_3)_2)_3$ | 40 | $CH_3$<br>\|<br>$HO(SiO)_tH$<br>\|<br>$CH_3$ (t = 25) | 58 | Tetra(2-ethylhexyl) titanate | 2 | 5 | Toluene | 95 | 30 | 100 | 2.0 |
| Ex. 3 | $CH_3$<br>\|<br>$Si(ON{=}C(CH_3)_2)_3$ | 3 | $CH_3$<br>\|<br>$HO(SiO)_tH$<br>\|<br>$CH_3$ (t = 800) | 92 | Tetra(2-ethylhexyl) titanate | 5 | 5 | Toluene | 95 | 100 | 20 | 1.5 |
| Ex. 4 | $CH_3$<br>\|<br>$Si(ON{=}C(CH_3)_2)_3$ | 10 | $CH_3$<br>\|<br>$HO(SiO)_tH$<br>\|<br>$CH_3$ (t = 3500) | 83 | Tetra(2-ethylhexyl) titanate | 7 | 5 | Toluene | 95 | 200 | 5 | 3.0 |

TABLE 2

| | Silicon-containing compound | | Silicon- and/or fluorine-containing compound | | Curing accelerator Compound | Part | Concentration of 3 components % | Solvent | Amount of solvent % | Curing conditions °C. | Curing conditions Min. | Film thickness μm |
|---|---|---|---|---|---|---|---|---|---|---|---|---|
| | Compound | Part | Compound | Part | | | | | | | | |
| Ex. 5 | $CH_3Si(ON{=}C(CH_3)_2)_3$ | 20 | $HO(SiO)_tH$ with $CH_3$/$CH_3$ side groups (t = 100) | 75 | Tetra(2-ethylhexyl)titanate | 5 | 0.5 | Toluene | 99.5 | 150 | 10 | 0.2 |
| Ex. 6 | $CF_3CH_2CH_2Si(ON{=}C(CH_3)_2)_3$ | 20 | $HO(SiO)_tH$ with $CH_3$/$CH_3$ side groups (t = 100) | 75 | Tetra(2-ethylhexyl)titanate | 5 | 1.0 | Toluene | 99 | 150 | 10 | 0.5 |
| Ex. 7 | $Si(ON{=}C(CH_3)_2)_4$ | 25 | $HO(SiO)_cH$ with $CH_3$/$CH_3$ side groups (c = 100) | 75 | — | — | 3.0 | Toluene | 97 | 150 | 30 | 1.2 |
| Ex. 8 | $Si(ON{=}C(CH_3)_2)_4$ | 20 | $HO(SiO)_cH$ with $CH_3$/$CH_3$ side groups (c = 100) | 75 | Tetra(2-ethylhexyl)titanate | 5 | 10.0 | Hexane/HCFC-141b = 50/50 | 90 | 100 | 20 | 5.0 |

TABLE 3

| | Silicon-containing compound | | Silicon- and/or fluorine-containing compound | | Curing accelerator | |
|---|---|---|---|---|---|---|
| | Compound | Part | Compound | Part | Compound | Part |
| Ex. 9 | $CH_3Si(ON{=}C(CH_3/C_2H_5))_3$ | 20 | $HO(SiO)_tH$ with $CH_3$/$CH_3$ side groups (t = 500) | 75 | Tetra(2-ethylhexyl)titanate | 5 |
| Ex. 10 | $CH_3Si(ON{=}C(CH_3)_2)_3$ | 20 | $C_2H_5O(Si{-}O)_tC_2H_5$ with $CH_3$/$CH_3$ side groups (t = 300) | 75 | Tetra(2-ethylhexyl)titanate | 5 |
| Ex. 11 | $CH_3Si(ON{=}C(CH_3)_2)_3$ | 20 | FOMBLIN Z DOL | 75 | Tetra(2-ethylhexyl)titanate | 5 |
| Ex. 12 | $CH_3Si(ON{=}C(CH_3)_2)_3$ | 40 | $C_8F_{17}CH_2CH_2Si(OCH_3)_3$ | 55 | Tetra(2-ethylhexyl)titanate | 5 |
| Ex. 13 | $CH_3Si(ON{=}C(CH_3)_2)_3$ | 50 | $C_{15}F_{31}CH_2CH_2Si(OH)_3$ | 47 | Tetra(2-ethylhexyl)titanate | 3 |

| | Concentration of 3 components % | Solvent | Amount of solvent % | Curing conditions °C. | Curing conditions Min. | Film thickness μm |
|---|---|---|---|---|---|---|
| Ex. 9 | 5 | Xylene/Cyclopolydimethylsiloxane = 50/50 | 95 | 150 | 10 | 1.0 |

TABLE 3-continued

| | | | | | | |
|---|---|---|---|---|---|---|
| Ex. 10 | 5 | Toluene | 95 | 150 | 20 | 1.5 |
| Ex. 11 | 5 | Trichlorotrifluoroethane | 95 | 150 | 20 | 2.0 |
| Ex. 12 | 5 | Trichlorotrifluoroethane | 95 | 150 | 20 | 2.0 |
| Ex. 13 | 5 | Trichlorotrifluoroethane | 95 | 150 | 20 | 1.0 |

TABLE 4

| | Silicon-containing compound | | Silicon- and/or fluorine-containing compound | | Curing accelerator | |
|---|---|---|---|---|---|---|
| | Compound | Part | Compound | Part | Compound | Part |
| Ex. 14 | $CH_3$<br>\|<br>$Si(ON{=}C(CH_3)_2)_8$ | 15 | $C_8F_{17}CH_2CH_2OC(=O)CH{=}CH_2$  70%<br><br>$HOCH_2CH_2OC(=O)C(CH_3){=}CH_2$  10%<br><br>$C_{18}H_{37}OC(=O)CH{=}CH_2$  20%<br><br>Molecular weight of polymer: 50,000 | 80 | Tetra(2-ethylhexyl)titanate | 5 |
| Ex. 15 | $CH_3$<br>\|<br>$Si(ON{=}C(CH_3)(CH_2CH_3))_3$ | 10 | $HOCH_2CF_2CF_2O(CF_2CF_2CF_2O)_{20}CF_2CF_2CH_2OH$ | 85 | Tetra(2-ethylhexyl)titanate | 5 |
| Ex. 16 | $CH_3$<br>\|<br>$Si(ON{=}C(CH_3)(CH_2CH_3))_3$ | 15 | $C_{10}F_{21}CH_2CH_2OC(=O)C(CH_2){=}CH_2$  85%<br><br>$HO(CH_2)_3OC(=O)CH{=}CH_2$  15%<br><br>Molecular weight of polymer: 100,000 | 85 | Tetra(2-ethylhexyl)titanate | 5 |

| | Concentration of 3 components % | Solvent | Amount of solvent % | Curing conditions °C. | Curing conditions Min. | Film thickness μm |
|---|---|---|---|---|---|---|
| Ex. 14 | 5 | Trichlorotrifluoroethane | 95 | 150 | 20 | 1.0 |
| Ex. 15 | 5 | Perfluorohexane | 95 | 150 | 20 | 2.0 |
| Ex. 16 | 5 | Perfluorohexane | 95 | 100 | 30 | 1.5 |

TABLE 5

| | Silicon-containing compound | | Silicon- and/or fluorine-containing compound | | Curing accelerator | |
|---|---|---|---|---|---|---|
| | Compound | Part | Compound | Part | Compound | Part |
| Ex. 17 | $CH_3Si(OCOCH_3)_3$ | 20 | $HO(SiO)_tH$ with $CH_3$ side groups ($t = 100$) | 75 | Tin octylate | 5 |
| Ex. 18 | $CH_3Si(O-C(CH_3)=CH_2)_3$ | 20 | $HO(SiO)_tH$ with $CH_3$ side groups ($t = 100$) | 75 | Tin octylate | 5 |
| Ex. 19 | $CH_3Si(NH-C_6H_{11})_3$ | 20 | $HO(SiO)_cH$ with $CH_3$ side groups ($c = 100$) | 75 | Tin octylate | 5 |
| Ex. 20 | $CH_3Si(N(CH_3)-C(=O)CH_3)_3$ | 20 | $HO(SiO)_cH$ with $CH_3$ side groups ($c = 100$) | 75 | Tin octylate | 5 |
| Ex. 21 | $CH_3Si(O-N=C(CH_3)(C_2H_5))_3$ | 20 | $HO(SiO)_cH$ with $CH_3$ side groups ($c = 100$) | 75 | Tin octylate | 5 |

| | Concentration of 3 components | | Amount of solvent | Curing conditions | | Film thickness |
|---|---|---|---|---|---|---|
| | % | Solvent | % | °C. | Min. | μm |
| Ex. 17 | 5.0 | Toluene | 95 | 150 | 10 | 1.5 |
| Ex. 18 | 5.0 | Toluene | 95 | 150 | 10 | 1.5 |
| Ex. 19 | 5.0 | Toluene | 95 | 150 | 10 | 1.5 |
| Ex. 20 | 5.0 | Toluene | 95 | 150 | 10 | 1.5 |
| Ex. 21 | 5.0 | Toluene | 95 | 150 | 10 | 1.5 |

The test for continuous mold releasing property, test for application and test for finishing were carried out with respect to EXAMPLES 2 to 21 in the same manner as in EXAMPLE 1.

As the solvent, a mixture of hexane and dichloromonofluoroethane (HCFC-141b) in a weight ratio of 50:50 was used in EXAMPLE 8, and a mixture of xylene and cyclopolydimethylsiloxane represented by the formula:

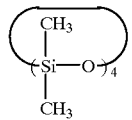

in a weight ratio of 50:50 was used in EXAMPLE 9. FOMBLIN Z DOL which was used as the silicon- and/or fluorine-containing compound in EXAMPLE 11 is a compound (having an alkoxyl group at both ends of perfluoropolyether) available from Japan Montedison Co., Ltd. In EXAMPLES 14 and 16, combinations of three kinds of compounds shown in TABLE 4 were used as the silicon- and/or fluorine-containing compound. The results are shown in TABLE 7.

COMPARATIVE EXAMPLES 1 TO 8

Mold releasing agents were prepared by using components shown in TABLE 6 in the same manner as in EXAMPLE 1. Cured films were formed in the same manner as in EXAMPLE 1 by changing the curing conditions as shown in TABLE 6. Thickness of each film is shown in TABLE 6.

TABLE 6

| | Silicon-containing compound | | Silicon- and/or fluorine-containing compound | | Curing accelerator | |
|---|---|---|---|---|---|---|
| | Compound | Part | Compound | Part | Compound | Part |
| Com. Ex. 1 | $Si(OCH_3)_4$ | 20 | $CH_3(SiO)_kH$ with $CH_3$ groups ($k = 1000$) | 75 | Tetra(2-ethylhexyl)titanate | 5 |
| Com. Ex. 2 | $Si(OCH_3)_4$ | 30 | $CH_3(SiO)_kH$ with $CH_3$ groups ($k = 50$) | 70 | — | — |
| Com. Ex. 3 | $(CH_3)_2Si(ONC(CH_3)_2)_2$ | 20 | $CH_3(SiO)_kH$ with $CH_3$ groups ($k = 300$) | 75 | Tetra(2-ethylhexyl)titanate | 5 |
| Com. Ex. 4 | $Si(OCH_2CH_3)_4$ | 20 | $CH_3(SiO)_kH$ with $CH_3$/CH groups ($k = 200$) | 75 | Tetra(2-ethylhexyl)titanate | 5 |
| Com. Ex. 5 | SH-200 350 cs | 100 | — | | — | — |
| Com. Ex. 6 | SH-7020 | 100 | — | | — | — |
| Com. Ex. 7 | Carnauba wax | 100 | — | | — | — |
| Com. Ex. 8 | $C_3F_7CH_2CH_2Si(ON=C(CH_3)_2)_3$ | 20 | $HO(SiO)_tH$ with $CH_3$ groups ($t = 100$) | 75 | Tetra(2-ethylhexyl)titanate | 5 |

| | Concentration of 3 components % | Solvent | Amount of solvent % | Curing conditions °C. | Curing conditions Min. | Film thickness μm |
|---|---|---|---|---|---|---|
| Com. Ex. 1 | 5 | Toluene | 95 | 150 | 10 | 2.0 |
| Com. Ex. 2 | 3 | Toluene | 97 | 100 | 30 | 2.0 |
| Com. Ex. 3 | 5 | Toluene | 95 | 100 | 30 | 3.0 |
| Com. Ex. 4 | 5 | Toluene | 95 | 150 | 10 | 1.0 |
| Com. Ex. 5 | 5 | S-3 | 95 | — | — | 5.0 |
| Com. Ex. 6 | 5 | S-3 | 95 | — | — | 3.0 |
| Com. Ex. 7 | 6 | Toluene | 94 | — | — | 10.0 |
| Com. Ex. 8 | 1.0 | Toluene | 99 | 150 | 10 | 0.5 |

The test for continuous mold releasing property, test for application and test for finishing were carried out in the same manner as in EXAMPLE 1 with regard to COMPARATIVE EXAMPLES 1 to 8.

SH-200 350cs used in COMPARATIVE EXAMPLE 5 is a dimethyl siloxane oil available from Toray Dow Corning Silicon Co., Ltd, and SH-7020 used in COMPARATIVE EXAMPLE 6 is a silicone wax available from Toray Dow Corning Silicon Co., Ltd.

The results are shown in TABLE 7. In case where the mold releasing property was evaluated as "D", the number of molding-releasing times is also shown in the parenthesis.

TABLE 7

| | Continuous mold releasing property | | | | | |
|---|---|---|---|---|---|---|
| | First release | Tenth release | Thirtieth release | Fiftieth release | Adhesion | Finishing |
| Ex.1 | A | A | A | A | 100/100 | A |
| Ex.2 | A | A | A | B | 100/100 | A |
| Ex.3 | A | A | A | A | 100/100 | A |
| Ex.4 | A | A | A | B | 100/100 | A |
| Ex.5 | A | A | A | A | 100/100 | A |
| Ex.6 | A | A | A | A | 100/100 | A |
| Ex.7 | A | A | A | A | 100/100 | A |
| Ex.8 | A | A | A | A | 100/100 | A |
| Ex.9 | A | A | A | A | 100/100 | A |
| Ex.10 | A | A | A | A | 100/100 | A |
| Ex.11 | A | A | A | A | 100/100 | A |
| Ex.12 | A | A | A | B | 100/100 | A |

TABLE 7-continued

| | Continuous mold releasing property | | | | | |
|---|---|---|---|---|---|---|
| | First release | Tenth release | Thirtieth release | Fiftieth release | Adhesion | Finishing |
| Ex.13 | A | A | A | B | 100/100 | A |
| Ex.14 | A | A | A | B | 100/100 | A |
| Ex.15 | A | A | A | A | 100/100 | A |
| Ex.16 | A | A | A | B | 100/100 | A |
| Ex.17 | A | A | B | B | 100/100 | A |
| Ex.18 | A | A | A | B | 100/100 | A |
| Ex.19 | A | A | B | B | 100/100 | A |
| Ex.20 | A | A | B | B | 100/100 | A |
| Ex.21 | A | A | A | A | 100/100 | A |
| Com. Ex.1 | A | A | B | D (35) | 90/100 | A |
| Com. Ex.2 | A | B | D (21) | — | 50/100 | B |
| Com. Ex.3 | A | D (8) | — | — | 0/100 | C |
| Com. Ex.4 | A | D (7) | — | — | 0/100 | C |
| Com. Ex.5 | C | D (2) | — | — | 0/100 | C |
| Com. Ex.6 | B | D (5) | — | — | 0/100 | B |
| Com. Ex.7 | B | D (2) | — | — | 0/100 | B |
| Com. Ex.8 | A | A | B | D (30) | 80/100 | A |

As is seen from the results shown in TABLE 7, the mold releasing agents of the present invention can give good results in every test for continuous mold releasing property, test for application and test for finishing irrespective of the use of the curing accelerator.

INDUSTRIAL APPLICABILITY

The mold releasing agent of the present invention is excellent in mold releasing property and has a long life, and in addition, gives an excellent finished surface of molded articles and scarcely sticks to the surface of the molded article, and therefore, secondary processability such as application property is not lowered.

We claim:

1. A method of improving mold releasability, which comprises a step of applying a mold releasing agent to a mold, wherein the mold releasing agent consists of (A) a silicon-containing compound represented by the formula (I):

$$R^1{}_n SiR^2{}_{4-n} \qquad (I)$$

wherein each $R^1$ is the same and is

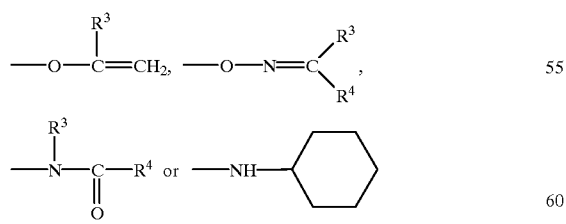

where $R^3$ and $R^4$ are a hydrocarbon group having 1 to 4 carbon atoms, respectively, $R^2$ is a hydrocarbon group having 1 to 4 carbon atoms or a halogenated hydrocarbon group having 1 to 4 carbon atoms, n is 3 or 4, (B) is a fluorine-containing compound which has at least two hydroxyl groups or alkoxyl groups in one molecule and is at least one selected from the group consisting of a copolymer having a number average molecular weight of not less than 1,000 and containing, as copolymerizing components, a compound represented by the formula (III):

$$RfA^4A^5 \qquad \text{}$$

wherein Rf is a perfluoroalkyl group having 6 to 21 carbon atoms, $A^4$ is an alkylene group having 1 to 6 carbon atoms, $A^5$ is represented by

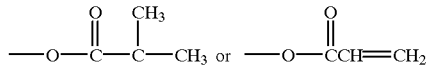

in an amount of not less than 20% by weight and a compound represented by the formula (IV):

$$A^6 OA^7 A^8 \qquad (IV)$$

wherein $A^6$ is a hydrogen atom, $A^7$ is an alkylene group having 1 to 6 carbon atoms, $A^8$ is represented by

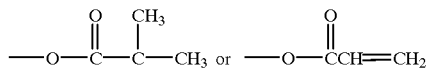

in an amount of not less than 2% by weight,
a compound represented by the formula (VI):

$$Y^1 OCH_2 R^{16} O\text{—}R^{18}\text{—}R^{17} CH_2 OY^2 \qquad (VI)$$

wherein $Y^1$ and $Y^2$ are hydrogen atoms, $R^{16}$ is —$CF_2$—, —$CF_2 CF_2$—, or

$R^{17}$ is —$CF_2$—, —$CF_2 CF_2$—, or

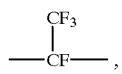

$R^{18}$ is at least one structural unit selected from the group consisting of $\text{---}(CF_2 O)_{s^1}$, $\text{---}(CF_2 CF_2 O)_{s^2}$ and $\text{---}(R^{19} O)_{s^3}$, $R^{19}$ is

or —$CF_2 CF_2 CF_2$—, $s^1 + s^2 + s^3$ is not less than 5 in average, and a compound represented by the formula (VII):

$$RfA^1 Si(OA^2)_{s6} A^3{}_{3-s^6} \qquad (VII)$$

wherein Rf is a perflouroallyl group having 6 to 21 carbon atoms, $A^1$ is an alkylene group having 2 to 6 carbon atoms, $A^2$ is hydrogen atom or an alkyl group having 1 to 4 carbon atoms, $A^3$ is an alkyl group having 1 to 4 carbon atoms, $s^6$ is 2 or 3, (C) a solvent and (D) a curing accelerator, and a weight ratio of the silicon-containing compound (A) to the fluorine-containing compound (B) is 1/99 to 80/20.

2. The method of improving mold releasability of claim 1, wherein the silicon-containing compound (A) is a compound represented by the formula (II):

 (II)

wherein $R^1$ is

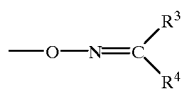

$R^3$ and $R^4$ are a hydrocarbon group having 1 to 4 carbon atoms, respectively, $R^2$ is a hydrocarbon group having 1 to 4 carbon atoms or a halogenated hydrocarbon group having 1 to 4 carbon atoms, and n is 3 or 4.

3. The method of improving mold releasability of claim 1, where in the solvent is an aliphatic hydrocarbon, an alicyclic hydrocarbon, an aromatic hydrocarbon, a halogenated hydrocarbon or a siloxane compound.

4. The method of improving mold releasability of claim 1, wherein the curing accelerator is a metal alkoxide or an organic acid salt.

5. The method of improving mold releasability of claim 1, wherein said mold releasing agent is applied to an inner surface of a die and then cured.

6. The method of improving mold releasability of claim 5, wherein the silicon-containing compound (A) is the compound represented by the formula (II):

 (II)

wherein $R^1$ is

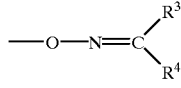

$R^3$ and $R^4$ are a hydrocarbon group having 1 to 4 carbon atoms, respectively, $R^2$ is a hydrocarbon group having 1 to 4 carbon atoms or a halogenated hydrocarbon group having 1 to 4 carbon atoms, and n is 3 or 4.

7. A method of molding, which comprises; the method of claim 1, wherein said mold releasing agent is applied to an inner surface of the die, filling the die with a composition for molding to form a molded article, and releasing the molded article from the die.

8. The method of molding of claim 7, wherein the silicon-containing compound (A) is the compound represented by the formula (II):

 (II)

wherein $R^1$ is

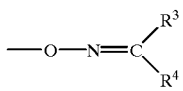

$R^3$ and $R^4$ are a hydrocarbon group having 1 to 4 carbon atoms, respectively, $R^2$ is a hydrocarbon group having 1 to 4 carbon atoms or a halogenated hydrocarbon group having 1 to 4 carbon atoms, and n is 3 or 4.

9. The method of improving mold releasability of claim 1, wherein $s^1+s^2+s^3$ is between 10 and 20, and m is 20 to 5,000.

10. A method of improving mold releasability, which comprises a step of applying a mold releasing agent to a mold, wherein said mold releasing agent consists of (A) a silicon-containing compound represented by the formula (I):

 (I)

wherein each $R^1$ is the same and is

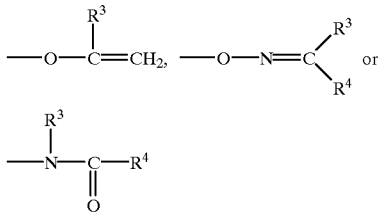

where $R^3$ and $R^4$ are a hydrocarbon group having 1 to 4 carbon atoms, respectively, $R^2$ is a hydrocarbon group having 1 to 4 carbon atoms or a halogenated hydrocarbon group having 1 to 4 carbon atoms, and n is 3 or 4, (B) is a fluorine-containing compound which has at least two hydroxyl groups or alkoxyl groups in one molecule and is at least one selected from the group consisting of a copolymer having a number average molecular weight of not less than 1,000 and containing, as copolymerizing components, a compound represented by the formula (III):

wherein Rf is a perfluoroalkyl group having 6 to 21 carbon atoms, $A^4$ is an alkylene group having 1 to 6 carbon atoms, $A^5$ is represented by

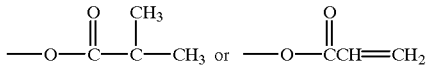

in an amount of not less than 20% by weight and a compound represented by the formula (IV):

 (IV)

wherein $A^6$ is a hydrogen atom, $A^7$ is an alkylene group having 1 to 6 carbon atoms, $A^8$ is represented by

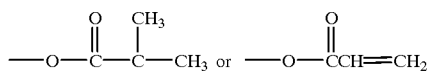

in an amount of not less than 2% by weight,

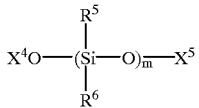

a compound represented by the formula (VI):

$$Y^1OCH_2R^{16}O-R^{18}-R^{17}CH_2OY^2 \quad (VI)$$

wherein $Y^1$ and $Y^2$ are hydrogen atoms, $R^{16}$ is —$CF_2$—, —$CF_2CF_2$—, or

$R^{17}$ is —$CF_2$—, —$CF_2CF_2$—, or

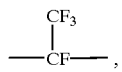

$R^{18}$ is at least one structural unit selected from the group consisting of —$(CF_2O)_{s^1}$—, —$(CF_2CF_2O)_{s^2}$— and —$(R^{19}O)_{s^3}$—,
$R^{19}$ is

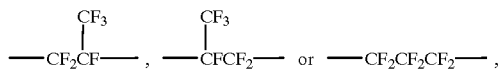

$s^1+s^2+s^3$ is not less than 5 in average, and a compound represented by the formula (VII):

$$RfA^1Si(OA^2)_{s^6}A^3_{3-s^6} \quad (VII)$$

wherein Rf is a perflouroalkyl group having 6 to 21 carbon atoms, $A^1$ is an alkylene group having 2 to 6 carbon atoms, $A^2$ is hydrogen atom or an alkyl group having 1 to 4 carbon atoms, $A^3$ is an alkyl group having 1 to 4 carbon atoms, $s^6$ is 2 or 3, (C) a solvent and
(D) a curing accelerator,
and a weight ratio of the silicon-containing compound (A) to the fluorine-containing compound (B) is 1/99 to 80/20.

11. A method of molding, which comprises applying a mold releasing agent to a mold, curing said mold releasing agent to form a cured film, molding an article in the mold, and releasing the article from the mold, wherein the mold releasing agent is limited to the following components:

(A) a silicon-containing compound represented by the formula (I):

$$R^1{}_nSiR^2{}_{4-n} \quad (I)$$

wherein each $R^1$ is the same and is

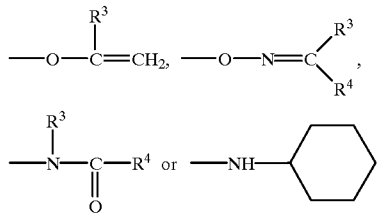

where $R^3$ and $R^4$ are a hydrocarbon group having 1 and 4 carbon atoms, respectively, $R^2$ is a hydrocarbon group having 1 to 4 carbon atoms or a halogenated hydrocarbon group having 1 to 4 carbon atoms, and n is 3 or 4, (B) is a fluorine-containing compound which has at least two hydroxyl groups or alkoxyl groups in one molecule and is at least one selected from the group consisting of
a copolymer having a number average molecular weight of not less than 1,000 and containing, as copolymerizing components,
a compound represented by the formula (III):

RfA⁴A⁵ wherein Rf is a perfluoroalkyl group having 6 to 21 carbon atoms, $A^4$ is an alkylene group having 1 to 6 carbon atoms, $A^5$ is represented by

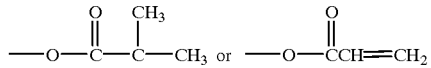

in an amount of not less than 20% by weight and
a compound represented by the formula (IV):

$$A^6OA^7A^8 \quad (IV)$$

wherein $A^6$ is a hydrogen atom, $A^7$ is an alkylene group having 1 to 6 carbon atoms, $A^8$ is represented by

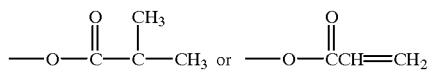

in an amount of not less than 2% by weight,

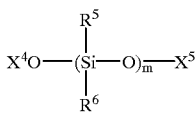

a compound represented by the formula (VI):

$$Y^1OCH_2R^{16}O-R^{18}-R^{17}CH_2OY^2 \quad (VI)$$

wherein $Y^1$ and $Y^2$ are hydrogen atoms, $R^{16}$ is

—CF$_2$—, —CF$_2$CF$_2$—, or

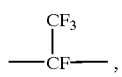

R$^{17}$ is —CF$_2$—, —CF$_2$CF$_2$—, or

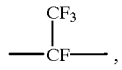

R$^{18}$ is at least one structural unit selected from the group consisting of $-(CF_2O)_{s^1}-$, $-(CF_2CF_2O)_{s^2}-$ and $-(R^{19}O)_{s^3}-$, R$^{19}$ is

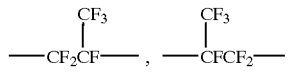

or —CF$_2$CF$_2$CF$_2$—, s$^1$+s$^2$+s$^3$ is not less than 5 in average, and a compound represented by the formula (VII):

 (VII)

wherein Rf is a perflouroalkyl group having 6 to 21 carbon atoms, A$^1$ is an alkylene group having 2 to 6 carbon atoms, A$^2$ is hydrogen atom or an alkyl group having 1 to 4 carbon atoms, A$^3$ is an alkyl group having 1 to 4 carbon atoms, s$^6$ is 2 or 3, (C) a solvent and
(D) a curing accelerator, and a weight ratio of the silicon-containing compound (A) to the fluorine-containing compound (B) is 1/99 to 80/20.

\* \* \* \* \*